United States Patent
Ding et al.

(10) Patent No.: US 10,616,502 B2
(45) Date of Patent: Apr. 7, 2020

(54) CAMERA PREVIEW

(71) Applicant: QUALCOMM Incorporated, San Diego, CA (US)

(72) Inventors: Jingting Ding, Hangzhou (CN); Fan Ling, Shanghai (CN); Xuan Zhou, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 15/757,278

(22) PCT Filed: Sep. 21, 2015

(86) PCT No.: PCT/CN2015/090123
§ 371 (c)(1),
(2) Date: Mar. 2, 2018

(87) PCT Pub. No.: WO2017/049430
PCT Pub. Date: Mar. 30, 2017

(65) Prior Publication Data
US 2018/0249091 A1    Aug. 30, 2018

(51) Int. Cl.
| | | |
|---|---|---|
| *H04N 5/262* | (2006.01) | |
| *H04N 5/232* | (2006.01) | |
| *G06T 7/254* | (2017.01) | |
| *G06T 5/00* | (2006.01) | |
| *G06T 5/50* | (2006.01) | |

(52) U.S. Cl.
CPC .......... *H04N 5/2621* (2013.01); *G06T 5/005* (2013.01); *G06T 5/50* (2013.01); *G06T 7/254* (2017.01); *H04N 5/23229* (2013.01); *H04N 5/23232* (2013.01); *H04N 5/23293* (2013.01); *H04N 5/232935* (2018.08)

(58) Field of Classification Search
CPC .......... G06T 5/005; G06T 5/50; G06T 7/254; H04N 5/23229; H04N 5/23232; H04N 5/23293; H04N 5/232935; H04N 5/2621
See application file for complete search history.

(56) References Cited

U.S. PATENT DOCUMENTS 9,807,306 B2 * 10/2017 Yu ...................... H04N 5/23293
10,044,928 B2 * 8/2018 Lee .................... H04N 5/23229
(Continued)

FOREIGN PATENT DOCUMENTS

| CN | 103561271 A | 2/2014 |
|---|---|---|
| CN | 103905716 A | 7/2014 |

(Continued)

OTHER PUBLICATIONS

Supplementary European Search Report—EP15904318—Search Authority—Munich—dated Mar. 8, 2019 9 pp.
(Continued)

*Primary Examiner* — Chiawei Chen
(74) *Attorney, Agent, or Firm* — QUALCOMM Incorporated

(57) ABSTRACT

An electronic device receives a plurality of images at different times while the device is operating in an image preview mode, and prior to a user-initiated image capture request, the electronic device generates a clean preview image that excludes one or more moving objects from the preview image.

27 Claims, 9 Drawing Sheets

(56) References Cited

U.S. PATENT DOCUMENTS

| | | | |
|---|---|---|---|
| 2005/0129324 A1* | 6/2005 | Lemke | H04N 1/387 382/254 |
| 2007/0177800 A1* | 8/2007 | Connell | G06K 9/00771 382/181 |
| 2008/0094498 A1* | 4/2008 | Mori | G03B 5/02 348/352 |
| 2008/0292193 A1* | 11/2008 | Bigioi | G03B 19/02 382/203 |
| 2009/0102935 A1* | 4/2009 | Hung | H04N 5/235 348/222.1 |
| 2010/0322475 A1* | 12/2010 | Ikeda | G06T 7/254 382/103 |
| 2011/0032367 A1* | 2/2011 | Ugawa | H04N 1/00283 348/211.1 |
| 2011/0103644 A1* | 5/2011 | Garten | G06T 5/005 382/103 |
| 2012/0063681 A1* | 3/2012 | Sandrew | G06T 11/001 382/167 |
| 2012/0148103 A1* | 6/2012 | Hampel | G06K 9/00771 382/103 |
| 2012/0243802 A1* | 9/2012 | Fintel | H04N 5/2625 382/284 |
| 2012/0262572 A1 | 10/2012 | Cudak et al. | |
| 2013/0093788 A1 | 4/2013 | Liu et al. | |
| 2014/0184858 A1* | 7/2014 | Yu | H04N 5/23293 348/241 |
| 2014/0341474 A1 | 11/2014 | Dollar et al. | |
| 2015/0022698 A1* | 1/2015 | Na | H04N 5/23222 348/241 |
| 2015/0146932 A1* | 5/2015 | Baek | G06T 7/254 382/107 |
| 2015/0221066 A1 | 8/2015 | Kobayashi et al. | |
| 2016/0309071 A1* | 10/2016 | Vranceanu | H04N 5/2355 |
| 2016/0323505 A1 | 11/2016 | Zhou et al. | |
| 2017/0006230 A1* | 1/2017 | Jeong | H04N 5/23293 |

FOREIGN PATENT DOCUMENTS

| | | |
|---|---|---|
| CN | 104486546 A | 4/2015 |
| CN | 104580882 A | 4/2015 |
| EP | 2355490 A2 | 8/2011 |
| JP | H11225344 A | 8/1999 |
| JP | 2012248998 A | 12/2012 |
| JP | 2015090591 A | 5/2015 |
| WO | 2014187265 A1 | 11/2014 |

OTHER PUBLICATIONS

International Search Report and Written Opinion—PCT/CN2015/090123—ISA/EPO—dated Jun. 21, 2016 11 pages.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

International Preliminary Report on Patentability from International Application No. PCT/CN2015/090123, dated Apr. 5, 2018, 5 pages.

* cited by examiner

CAMERA PREVIEW

TECHNICAL FIELD

This disclosure relates to techniques for rendering an image with a computing device.

BACKGROUND

When taking a picture of a background scene with unwanted objects in the foreground (e.g., people, cars, and other moving objects), the picture taker often desires to have a picture of the background scene with as few of the unwanted objects as possible. Solutions currently exist for taking multiple pictures near in time and synthesizing the multiple pictures into a single picture with the unwanted objects removed. These existing solutions, however, remove the objects in post-processing. Some existing solutions permit users to manually identify objects in already-captured images and remove those objects.

SUMMARY

This disclosure describes methods and devices for generating, in an image preview mode, a preview image that excludes unwanted objects. Thus, the user of a device implementing the techniques of this disclosure may see a clean preview image (i.e., the image with the unwanted objects removed) prior to capturing a final image (e.g., in real time or near-real time). In some examples, the user use the clean preview in making pre-capture adjustments to focus, framing, orientation, zoom, lighting, and any other such parameters. After taking the picture, the camera may generate a final image without the unwanted objects that is substantially similar to, and at some resolutions perhaps even indistinguishable from, the preview image with the unwanted objects removed, which the user saw in the image preview mode.

According to one aspect of this disclosure, a method includes receiving, from an image sensor, a plurality of images at different times, wherein receiving the plurality of images occurs in an image preview mode and prior to a user-initiated image capture request; storing, in a buffer, a first set of copies of the plurality of images, wherein the first set of copies is at a first resolution; classifying pixels of each image of the first set of copies as moving object pixels or background pixels; and generating a preview image using background pixels from two or more images of the first set of copies, wherein the preview image excludes one or more of the moving object pixels.

According to another aspect of this disclosure, an electronic device includes a memory and one or more processors configured to receive, from an image sensor, a plurality of images at different times, wherein the one or more processors receive the plurality of images while operating in an image preview mode and prior to a user-initiated image capture request; store, in the memory, a first set of copies of the plurality of images, wherein the first set of copies is at a first resolution; classify pixels of each image of the first set of copies as moving object pixels or background pixels; and generate, for output on the display, a preview image using background pixels from two or more images of the first set of copies, wherein the preview image excludes one or more of the moving object pixels.

According to another aspect of this disclosure, an apparatus includes means for receiving, from an image sensor, a plurality of images at different times, wherein receiving the plurality of images occurs in an image preview mode and prior to a user-initiated image capture request; means for storing a first set of copies of the plurality of images, wherein the first set of copies is at a first resolution; means for classifying pixels of each image of the first set of copies as moving object pixels or background pixels; and means for generating a preview image using background pixels from two or more images of the first set of copies, wherein the preview image excludes one or more of the moving object pixels.

According to another aspect of this disclosure, a computer-readable storage medium stores instructions that when executed by one or more processors cause the one or more processors to receive, from an image sensor, a plurality of images at different times, wherein receiving the plurality of images occurs in an image preview mode and prior to a user-initiated image capture request; store, in a buffer, a first set of copies of the plurality of images, wherein the first set of copies is at a first resolution; classify pixels of each image of the first set of copies as moving object pixels or background pixels; and generate a preview image using background pixels from two or more images of the first set of copies, wherein the preview image excludes one or more of the moving object pixels.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

In existing solutions for removing unwanted objects from pictures, the picture taker does not actually see the picture with the unwanted objects removed in the preview window prior to capturing the picture(s), but instead only sees such a picture after capturing the picture(s). This disclosure describes methods and devices for generating, in an image preview mode, a preview image that excludes unwanted objects. Thus, the user of a device implementing the techniques of this disclosure may see the clean preview image (i.e., the image with the unwanted objects removed) prior to capturing a final image (e.g., in real time or near-real time) and may use the clean preview in making pre-capture adjustments to focus, framing, orientation, zoom, lighting, and any other such parameters.

After taking the picture, the camera may generate a final image without the unwanted objects that is substantially similar to, and at some resolutions perhaps even indistinguishable from, the preview image with the unwanted objects removed, which the user saw in the image preview mode. The final image, however, may not be identical to the preview image, as the final image may, for example, be generated using different image processing techniques. In order to facilitate real time or near-real time generation of the clean preview images, the processing used to generate the clean preview image may, for example, be less complicated and time-intensive than the processing used to generate the final image. Additionally or alternatively, the clean preview image may be a lower spatial resolution image than the final image.

As used in this disclosure, the terms clean preview image and clean final image generally refer to images that are synthesized from a plurality of images captured at different times. The images may be synthesized in a manner that at least a portion of one or more objects present in the plurality of images are not present in the clean preview image or clean final image. The camera may determine which objects to exclude based on a determination that the one or more objects are likely unwanted objects. As will be described in more detail below, a camera may receive, from an image sensor of the camera, for example, a plurality of images and detect movement of objects from one image to another image, and based on the movement of the objects, identify unwanted objects to exclude from the clean preview image or clean final image.

Figure 1:
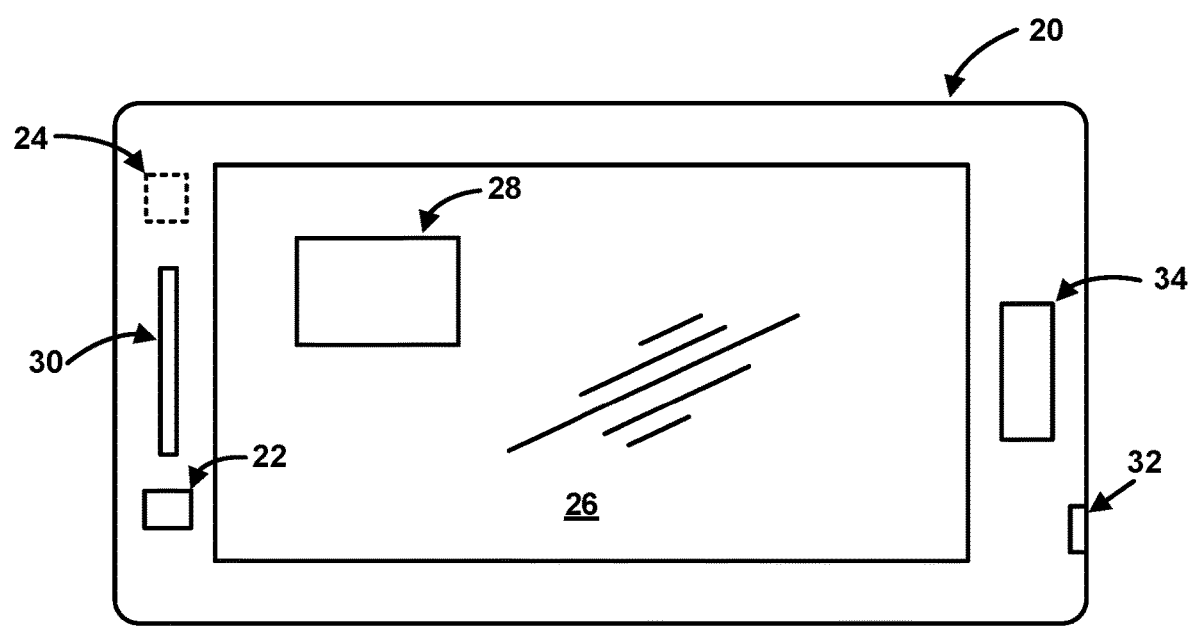
FIG. 1 illustrates an example device that may implement techniques of this disclosure.

FIG. 1 illustrates an example device that may implement techniques of this disclosure and be configured to generate a clean preview image. In general, the techniques of this disclosure may be implemented with devices having at least one image sensor and image processor (which may be configured for high and/or low resolution pictures and/or video). For example, device 20 includes a front image sensor 22, a rear image sensor 24, a display 26, and a picture-in-picture (PIP) window 28. Device 20 also includes speaker 30, microphone 32, and button 34 and may include a host of other components not explicitly shown in the example of FIG. 1.

Device 20 may comprise any of a wide range of devices including, for example, telephone handsets such as so-called "smart" phones, tablet computers, wearable computing devices (e.g., head-mounted displays and watches), cameras, notebook (i.e., laptop) computers, digital media players, video gaming consoles or handheld devices, video streaming devices, or the like. While device 20 may be a portable device, the techniques of this disclosure are not limited in this way. For example, according to other aspects, the techniques may be used with desktop computers, set-top boxes, televisions, drones, or other devices.

Front image sensor 22 and rear image sensor 24 may be configured to capture images. For example, front image sensor 22 and rear image sensor 24 may include any components for converting an optical image into an electronic signal. Example image sensors include charge-coupled devices (CCD), complementary metal-oxide-semi-conductor (CMOS), N-type metal-oxide-semiconductor (NMOS), or the like. In some instances, as described in greater detail below, front image sensor 22 and rear image sensor 24 may be included in one or more camera systems or sub-systems.

Displays 26 may include a liquid crystal display (LCD), a light emitting diode (LED), an organic light emitting diode (OLED), or any other type of device that can generate output to a user. In some instances, display 26 may be configured as touch-sensitive and/or presence-sensitive displays.

In the example shown in FIG. 1, device 20 includes PIP window 28. In some examples, the PIP windows may provide areas for displaying content independently from other content being displayed at displays 26. For example, device 20 may be configured to perform PIP image previewing when a camera application is being executed. In this example, device 20 may preview images for capture by front image sensor 22 or rear image sensor 24 on display 26, while PIP window 28 displays some other information. In other examples, device 20 may preview images for capture by front image sensor 22 or rear image sensor 24 in PIP window 28, while the remainder of display 26 displays some other information.

Device 20 may be configured to operate in a basic image preview mode, where display 26, i.e., either the entirety of display 26 or only PIP window 28, presents preview images to a user. In general, the preview images show what is within a field of view of front image sensor 22 or rear image sensor 24 at any particular moment in time. The preview images may be updated sufficiently frequently that as the objects within the FOV of front image sensor 22 or rear image sensor 24 change, the content of the preview images shown on display 26 also changes in what appears to a user to be real time. In response to a user-initiated image capture request, such as a touch command, voice command, pressing of a button, or other such action, device 20 may be configured to capture a final image that is substantially similar to the preview image being displayed at the time the user-initiated image capture request is received.

Device 20 may be further configured to operate in an image preview mode with a clean preview feature enabled. When device 20 is operating with the clean preview feature enabled, display 26 may present preview images to a user as described above, but the preview images may exclude one or more unwanted objects. Device 20 may receive, via front image sensor 22 or rear image sensor 24, a plurality of images at different times. Device 20 may store a first set of copies of the plurality of images. Device 20 may classify pixels of each image of the first set of copies as moving object pixels or background pixels and generate a preview image using background pixels from two or more images of the first set of copies. Device 20 may display the clean preview images on displays 26.

While displaying the clean preview image, a user of device 20 may initiate an image capture request. In response to the user-initiated image capture request, device 20 may generate a final image that is approximately the same as the clean preview image being displayed at the time of the user-initiated image capture request. Device 20 may continuously update the clean preview image, such that the clean preview changes in what appears to a user to be real time or near real time. Unlike in the basic image preview mode, however, with the clean preview feature enabled, the preview shown on display 26 may exclude certain objects that are within the field of view of front image sensor 22 or rear image sensor 24.

Figure 2A:
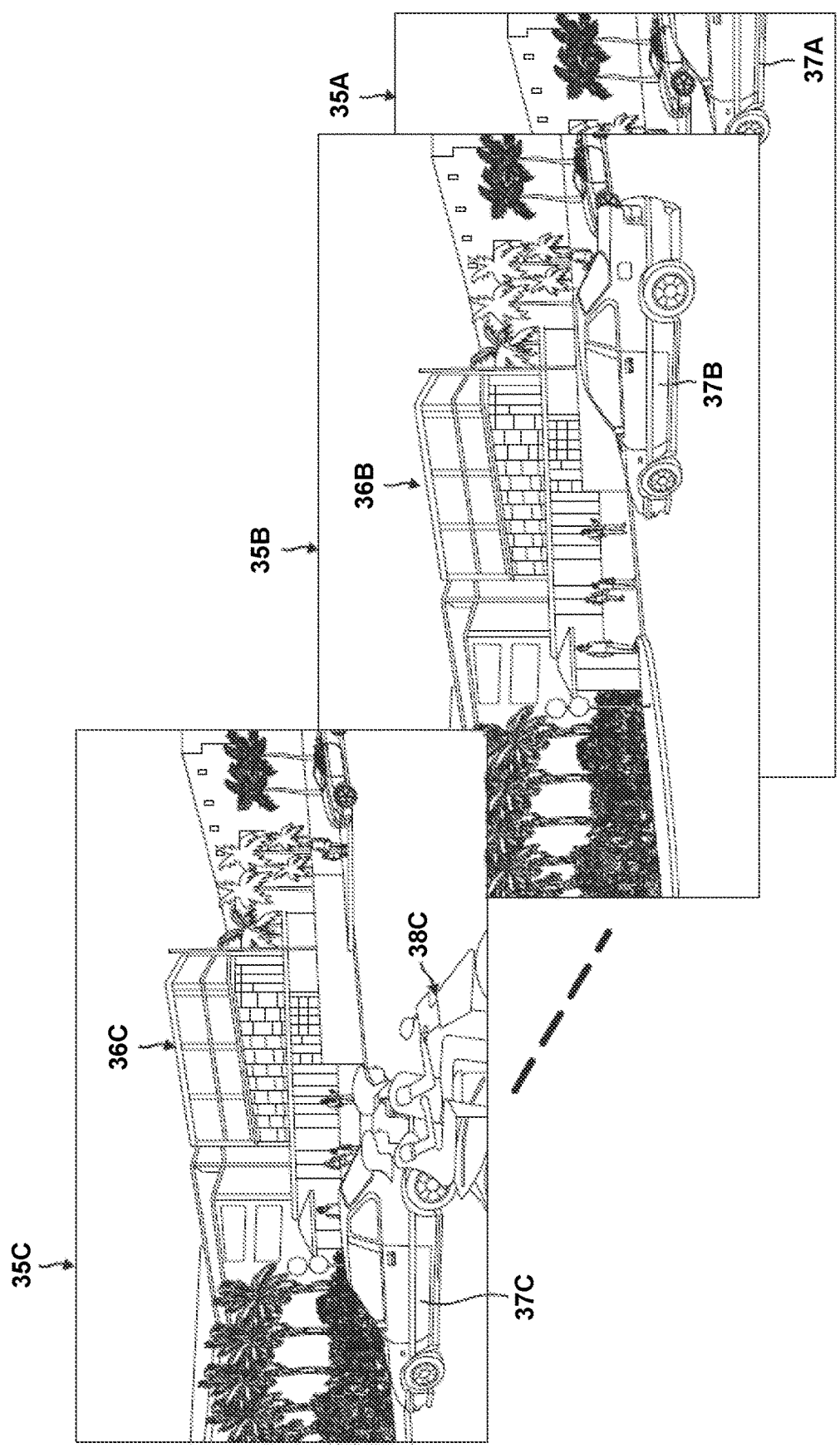
FIG. 2A shows an example of a plurality of images that may be captured by the device shown in FIG. 1.

FIG. 2A shows an example of images that may be received by device 20 via either front image sensor 22 or rear image sensor 24. In the example of FIG. 2A, images 35A, 35B, and 35C (images 35) are images of the same scene received by device 20 at slightly different times. Images 35 may, for example, be images that were received a few tenths of a second apart from one another. Device 20 may store, in a buffer, low resolution copies of images 35. Device 20 may, for example, receive images 35 at a higher resolution, such as 1080P, but store lower resolution versions of images 35, such as quarter video graphics array (QVGA) images, in the buffer.

As can be seen in the examples of FIG. 2A, images 35 include a building (labeled 36A and 36B). The building in image 35C is not explicitly shown. Images 35 further include a car (labeled 37A, 37B, and 37C, collectively "car 37") and a motorcycle 38A. Based on the movement of car 37 and motorcycle 38A in images 35, device 20 may determine that car 37 and motorcycle 38A are unwanted objects. Utilizing techniques that will be described in more detail below, device 20 may generate, from images 35, a clean preview image for display on display 26.

Device 20 may, for example, automatically (e.g., without user input) determine that an object is unwanted based on characteristics of the object such as a motion of the object. Additionally or alternatively, device 20 may determine that an object is an unwanted object based in part on user input. A user may, for example, identify with a touch or some other command an object to be removed from the preview image. In other implementations, a user may identify an object to keep in the preview image, and in response to such identification device 20 may remove from the preview image objects determined to be unwanted objects while keeping in the preview the identified object.

In some use scenarios, multiple objects in a field of view may exhibit the characteristics of unwanted objects, even though the objects are objects that the user desires to keep in the image. As one example, when photographing a soccer game, a user of device 20 may wish to include soccer players in their pictures while excluding non-players who may enter into the field of view. As the players are moving, they may exhibit characteristics (e.g., motion) of typically unwanted objects, but based on user input, device 20 can differentiate the players from unwanted objects.

Figure 2B:
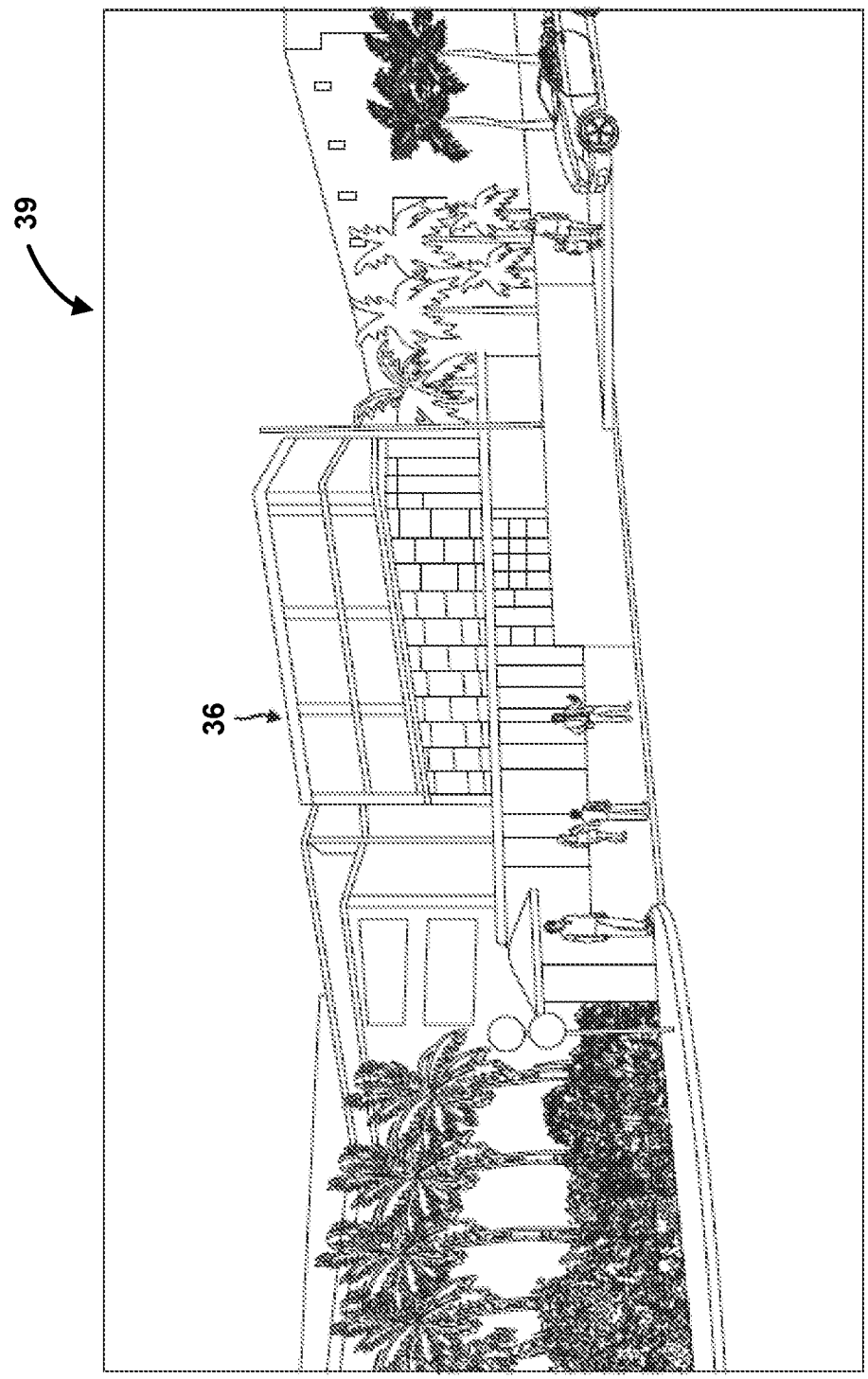
FIG. 2B shows an example of a preview image generated from the plurality of images in FIG. 2A in accordance with an example of the techniques of this disclosure.

FIG. 2B shows an example of clean preview image 39 generated from images 35 of FIG. 2A. As can be seen in image 39, building 36 is present, but car 37 and motorcycle 38A are excluded from clean preview image 39. Clean preview image 39 is synthesized from two or more images of images 35. In other words, a first portion of clean preview image 39 may be taken from image 35A, a second portion of 35B, and a third portion from 35C to form a synthesized image. The synthesized image may be further processed, for example, filtered, prior to being displayed by display 26.

Figure 3:
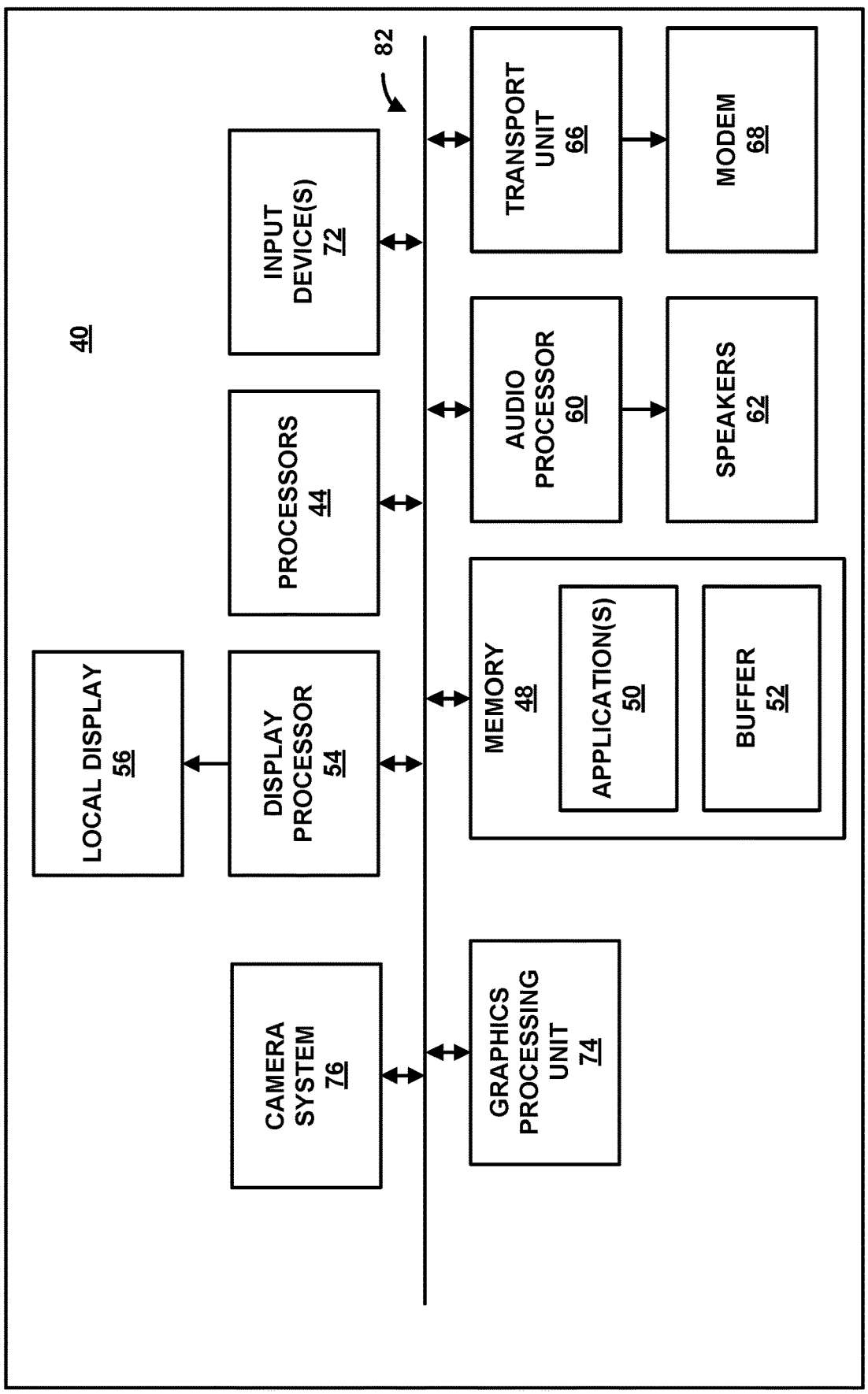
FIG. 3 is a block diagram showing an example of a device that may be configured to implement the techniques of this disclosure.

FIG. 3 is a block diagram showing one example of a device 40 that may be configured to implement the techniques of this disclosure. In some examples, one or more components shown and described with respect to device 40 may be incorporated into device 20.

In the example shown in FIG. 3, device 40 includes one or more processors 44, memory 48, display processor 54, local display 56, audio processor 60, speakers 62, transport unit 66, wireless modem 68, input devices 72, and camera system(s) 76. Other examples may include more or fewer components than those shown in FIG. 3. In addition, while certain components are described separately for purposes of discussion, it should be understood that some components shown and described with respect to FIG. 3 may be highly integrated or combined to form a single component.

Each of components 44, 48, 54, 60, 66, 72, and 76 may be interconnected (physically, communicatively, and/or operatively) for inter-component communications via communication channels 82. In some examples, communication channels 82 may include a system bus, network connection, inter process communication data structure, or any other channel for communicating data.

One or more processors 44 may be capable of processing instructions stored in storage device memory 48. One or more of processors 44 may form a central processing unit (CPU) for device 40. Processors 44 may include, for example, one or more microprocessors, DSPs, ASICs, FPGAs, discrete logic, or any combinations thereof. In some examples, processors 104 may include fixed function logic and/or programmable logic, and may execute software and/or firmware. When the techniques are implemented partially in software, a device may store instructions for the software in a suitable, non-transitory computer-readable medium and execute the instructions in hardware using one or more processors to perform the techniques of this disclosure.

In some examples, processors 44 may be configured to encode and/or decode A/V data for transport, storage, and display. For example, one or more of processors 44 may operate as a video encoder or a video decoder, either of which may be integrated as part of a combined video encoder/decoder (codec). In some instances, the codec may operate according to a video compression standard, such as the ITU-T H.264 standard, alternatively referred to as MPEG-4, Part 10, Advanced Video Coding (AVC), or extensions of such standards. Other examples of video compression standards include MPEG-2 and ITU-T H.263 and the ITU-T H.265, High Efficiency Video Coding (HEVC) standard.

Memory 48 of FIG. 3 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), magnetic random access memory (MRAM), FLASH memory, and the like, Memory 48 may comprise a computer-readable storage medium for storing audio/video data, as well as other kinds of data.

In some examples, memory 48 may store applications 50 that are executed by processor 44 as part of performing the various techniques described in this disclosure. Applications 50 may, for example, include a camera application configured to generate clean preview images in accordance with the techniques of this disclosure. Memory 48 may further include buffer 52, which may be one or both of a frame buffer or an image buffer, as will be explained in more detailed below. This disclosure will generally use the term image buffer to refer to a buffer that stores full resolution copies of received images and will use the term frame buffer to refer to a buffer that stores down-sampled versions of the received images. As will be explained in more detail below, the frames stored in the frame buffer may be used for generating preview images, while the images stored in the image buffer may be used for generating final images. Memory 48 may also store certain A/V data for presentation by device 40. For example, memory 48 may store an entire A/V file, or may comprise a smaller buffer that simply stores a portion of an A/V file, e.g., streamed from another device or source. In any event, memory 48 may buffer A/V data before the data is presented by device 40.

In some examples, device 40 may locally process and display A/V data. In particular, display processor 54 may form a portion of a platform for processing video data to be displayed on local display 56. In this regard, display processor 54 may include a codec (as described above with respect to processors 44). Display 56 may include a liquid crystal display (LCD), light emitting diode (LED), organic light emitting diode (OLED), or any other type of device that can generate intelligible output to a user. In addition, audio processor 60 may process audio data for output on one or more speakers 62.

Transport unit 66 may process encoded A/V data for a network transport. For example, encoded A/V data may be processed by processors 44 and encapsulated by transport unit 66 into Network Access Layer (NAL) units for communication across a network. The NAL units may be sent by modem 68 to another device via a network connection. In this regard, modem 68 may operate according to any number of communication techniques including, e.g., orthogonal frequency division multiplexing (OFDM) techniques, time division multi access (TDMA), frequency division multi access (FDMA), code division multi access (CDMA), or any combination of OFDM, FDMA, TDMA and/or CDMA, WiFi, Bluetooth, Ethernet, the IEEE 802.11 family of standards, or any other wireless or wired communication technique. In some instances, modem 68 of device 40 may receive encapsulated data packets, such as NAL units, and sends the encapsulated data units to transport unit 66 for decapsulation. For instance, transport unit 66 may extract data packets from the NAL units, and processors 44 can parse the data packets to extract the user input commands.

One or more input devices 72 may be configured to receive input from a user through tactile, audio, or video feedback. Examples of input device 42 include a touch and/or presence sensitive screen, a mouse, a keyboard, a voice responsive system, a microphone or any other type of device for detecting a command from a user.

Graphics processing unit (GPU) 74 represents one or more dedicated processors for performing graphical operations. That is, for example, GPU 74 may be a dedicated hardware unit having fixed function and programmable components for rendering graphics and executing GPU applications. GPU 74 may also include a DSP, a general purpose microprocessor, an ASIC, an FPGA, or other equivalent integrated or discrete logic circuitry. Although GPU 74 is illustrated as a separate unit in the example of FIG. 3, in some examples, GPU 74 may be integrated with one or more other processors 44 (such as a CPU) into a single unit.

Camera system 76 may include one or more image processors, one or more image sensors (e.g., CCD sensors, CMOS sensors, NMOS sensors, or the like), as well as a number of other components for capturing images. Camera system 76 may include one or more components for so-called camera phones or video phones. In some examples, camera system 76 may support multiple image sensors (e.g., a front image sensor and a rear image sensor of a camera phone or video phone). The image streams generated by such image sensors of camera system 76 may be processed by one or more image processors. In some instances, camera system 76 may operate in combination with GPU 74 to generate computer graphics-based data as the source video, or a combination of live video, archived video, and/or computer-generated video. The captured, pre-captured, or computer-generated video may be encoded by a video encoder (described above).

Figure 4:
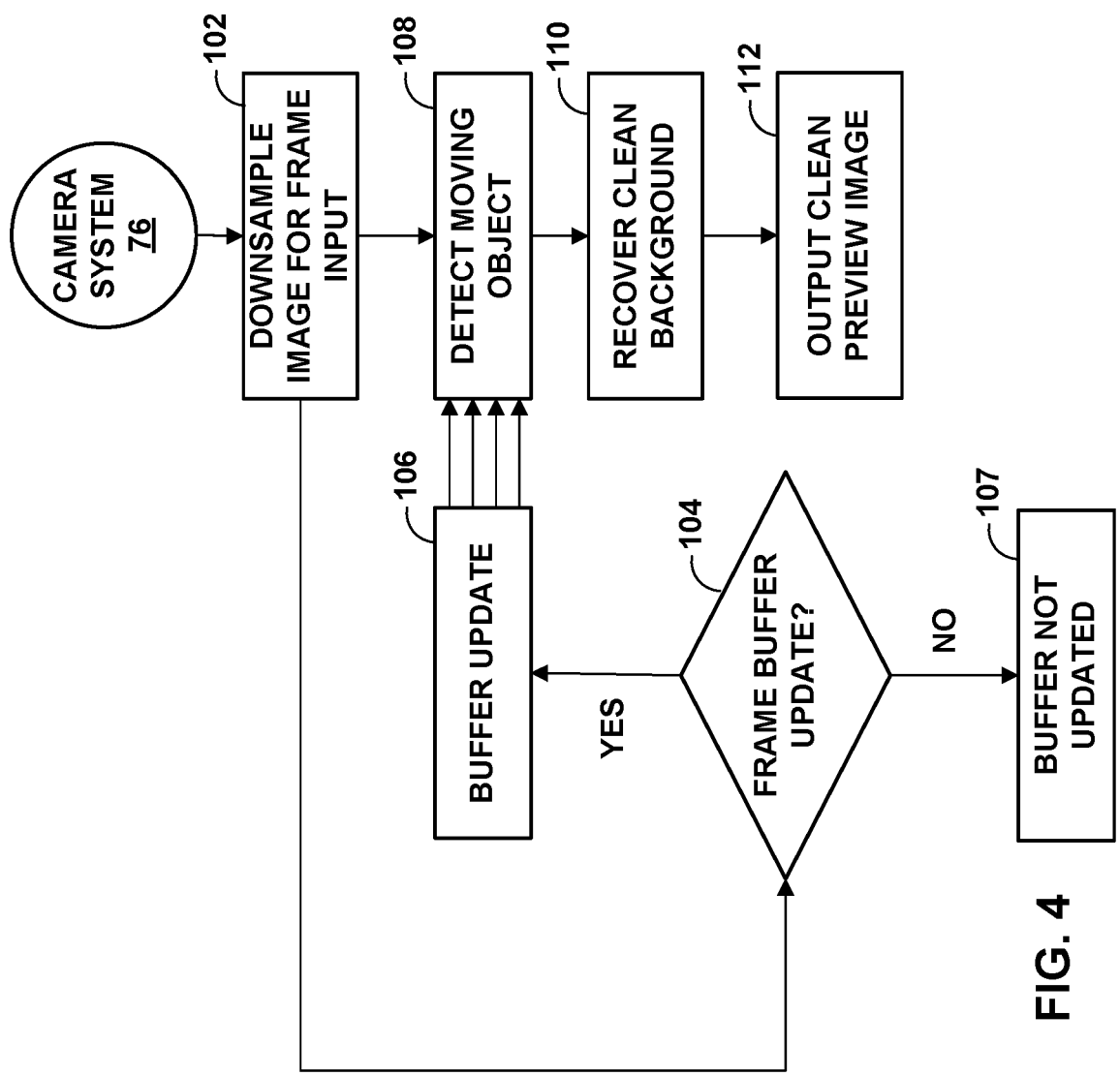
FIG. 4 is a flow diagram showing techniques for generating a preview image according to an example of the techniques of this disclosure.

FIG. 4 shows a flowchart illustrating aspects of operation of device 40. Device 40 may execute a camera application stored in applications 50 of memory 48. Upon execution of the camera application, device 40 may access camera system 76 and receive at time $t_0$ an image input from camera system 76 and downsample the image to determine a $t_0$ frame input (102). Camera system 76 may, for example, receive images at 30 frames per second. After downsampling the image, device 40 may determine if the frame buffer is to be updated (104). If the frame buffer is to be updated (104, YES), then device 40 may add the $t_0$ frame to the frame buffer and may also remove an older frame from the frame buffer (106). If the frame buffer is not to be updated (104, NO), then device 40 may not update the buffer (107). For example, device 40 may not add the $t_0$ frame to the frame buffer and may also not remove an older frame from the frame buffer. It should be understood that a decision at block 204 to not add the frame to the frame buffer only means that the frame is not added to the frame buffer for future use in generating preview frames and does not necessarily mean that the frame is not buffered for other purposes.

Device 40 may update the frame buffer at a lower rate than the rate at which camera system 76 receives images. For example, if camera system 76 receives images at 30 fps, then device 40 may update the frame buffer at 3 fps. Thus, the determination of whether to update the frame buffer made at block 104 of FIG. 4 may be based on the time at which an image is received or a picture order count (POC) value or frame number associated with a frame. The rate at which device 40 updates the frame buffer may be selected so that a sufficiently long enough time period between any two buffered frames occurs. The period of time may be selected so that, due to the motion of the unwanted object, the unwanted object is at a sufficiently different location in one buffered frame relative to a second buffered frame. Using the example of 30 fps and 3 fps introduced above, if device 40 updates the frame buffer with a frame of an image received at time $t_0$, then device 40 may not update the frame buffer again until time $t_{10}$, meaning frames determined for times $t_1$ through $t_9$ are not added to the frame buffer.

As part of generating a clean preview, device 40 may, for example, compare the $t_0$ frame input with two or more prior frame inputs stored in the frame buffer to detect a moving object in the $t_0$ frame (108). For purposes of this example, it can be assumed that the frame buffer is already storing frame inputs for $t_{-10}$, $t_{-20}$, etc. Device 40 may detect moving objects by comparing values of pixels of the $t_0$ frame to values of pixels at corresponding locations in the buffered frames. If the pixel values at a certain pixel location in a frame are consistent across all frames (i.e. the $t_0$ frame and the frames stored in the frame buffer), then that pixel value likely corresponds to a background pixel. If the pixel values at a certain location in a frame are not consistent across all the frames, then pixels at that location of at least some of the frames likely correspond to moving object pixels. For a particular pixel location, to determine for that pixel location which frames include background pixels and which frames include moving object pixels, device 40 may be configured to perform a voting technique, where the most frequently occurring pixel value is assumed to correspond to background. For the $t_0$ frame, device 40 may determine a label map. The label map identifies, for each pixel location in the preview image, a frame from which to obtain a pixel value for generating the preview image. The frame from which to obtain the pixel value may be either the current frame (i.e. the $t_0$ frame) or one of the buffered frames (i.e. the $t_{-10}$ frame, $t_{-20}$ frame, $t_{-30}$ frame, etc.).

To determine the label map, device 40 may generate a background probability map for a current frame using a voting process. As part of the voting process, device 40 may compare pixel values for a certain pixel location of two or more buffered frames and the current frame to determine if a particular pixel in the current frame is an unwanted object pixel or a background pixel. Device 40 may, for example, generate a histogram for every location to determine a most frequently occurring pixel value and select a buffered frame or the current frame corresponding to the most frequently occurring pixel value as the frame to use for that pixel location when generating the preview image.

Device 40 may consider the neighborhood pixel value similarity information during the determination of the label map. If the adjacent pixels and the current pixel are close in pixel value, then their label values tend to be the same. Intuitively, since their pixel values are close, these pixels may belong to the same part of a foreground object or a background object. Device 40 may select, for every pixel location, the frame index associated with the largest probability value as the frame index to include in a label map.

Device 40 may recover a clean background (110). As part of recovering the clean background, device 40 may replace moving object pixels of the $t_0$ frame input with background pixels of one buffered frame input. To recover the clean background, device 40 may synthesize an image from one or more images stored in the frame buffer. For each pixel location of the synthesized image, device 40 may determine a pixel value for a background pixel at a corresponding location in one of the images stored in the frame buffer based on the label map. Thus, the synthesized image may include pixel values for background pixels of the image received at $t_0$, background pixels of the image received at $t_{-10}$, background pixels of the image received at $t_{-20}$, and potentially background pixels of other images stored in the frame buffer. Device 40 may output, via local display 56, for example, a clean preview image (112).

Device 40 may update the preview image being displayed at display 56 in a real time or near real time manner. For example, device 40 may receive a new frame input at $t_1$, in which case the image received at $t_0$ is now stored in the frame buffer. As explained above, the buffer may only be updated at 3 fps while camera system 76 generates images at 30 fps. Thus, at block 104, the frame input for $t_1$ may not be added to the frame buffer. The frame input for $t_1$ may, however, still be used for generating the clean preview image. Thus, at blocks 108 and 110, the frames used for detecting moving objects and generating label maps may include the frames for $t_1$ as well as buffered frames for $t_0$, $t_{-10}$, $t_{-20}$, etc.

Figure 5:
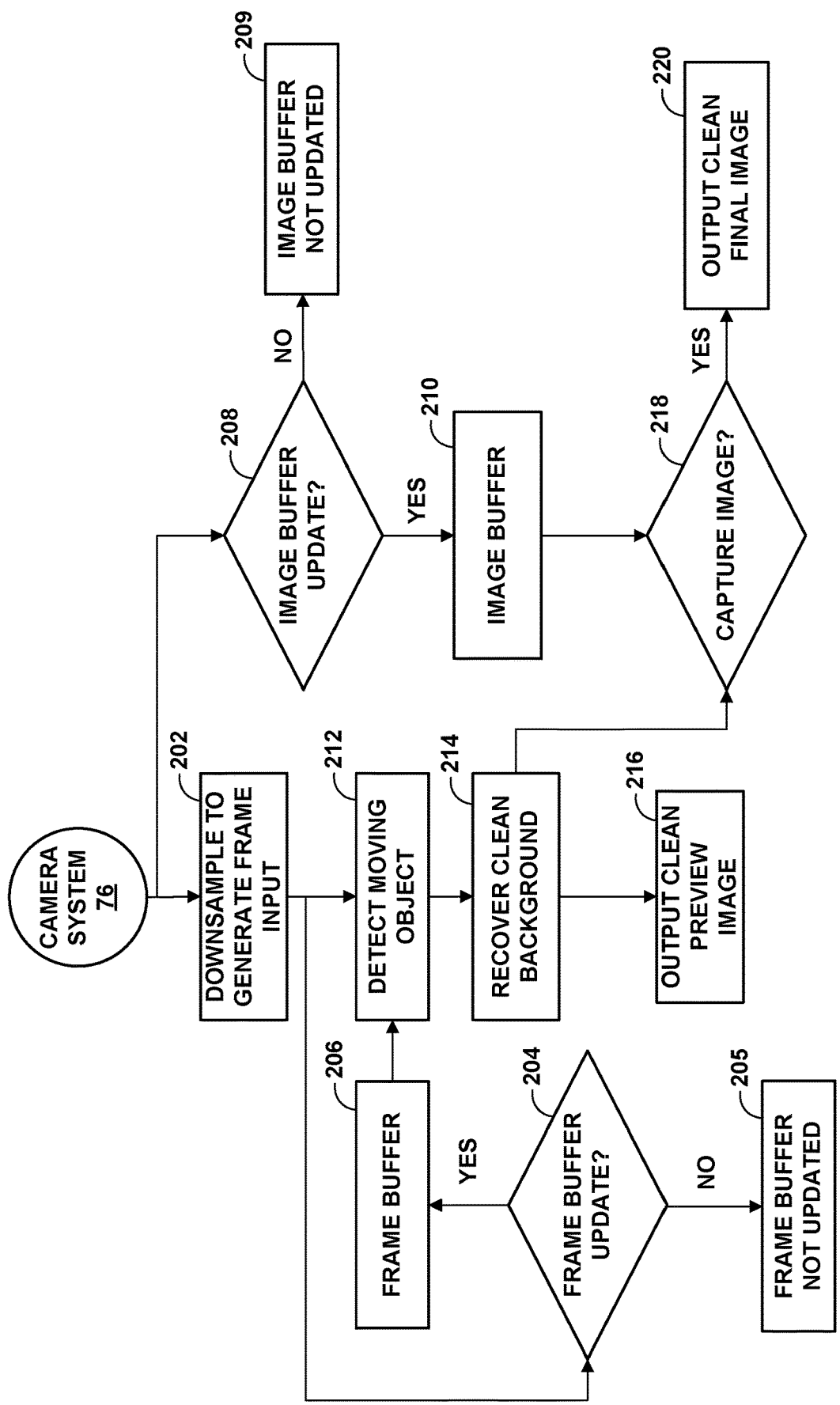
FIG. 5 is a flow diagram showing techniques for generating a preview image according to an example of the techniques of this disclosure.

FIG. 5 shows a flowchart illustrating aspects of operation of device 40. Device 40 may execute a camera application stored in applications 50 of memory 48. Upon execution of the camera application, device 40 may access camera system 76. At time t=0, camera system 76 may receive an image. Device 40 may downsample the received image to a first resolution to generate a frame input (202). Device 40 may also determine if a frame buffer should be updated (204). In response to determining the frame buffer should be updated (204, YES), device 40 may store a copy of the input frame in the frame buffer (206). In response to determining the frame buffer should not be updated (204, NO), device 40 may not update the frame buffer (205). Device 40 may also determine if an image buffer should be updated (208). In response to determining the image buffer should be updated (208, YES), device 40 may store, in the image buffer, a copy of the image at a second resolution that is higher than the first resolution (210). The second resolution may, for example, be the native resolution of the image received by camera system 76. In response to determining the image buffer should not be updated (208, NO), device 40 may not update the image buffer (209). For example, device 40 may not store, in the image buffer, a copy of the image.

As discussed above with respect to FIG. 4, the decision of whether or not to update the frame buffer may be based on a frame update buffer rate, which may be different than the rate at which camera system 76 receives images. If, for example, camera system 76 receives images at a rate of 15 fps and device 40 updates the frame buffer at a rate of 5 fps, then only one out of every three images received by camera system 76 may be used to update the frame buffer. Similarly, device 40 may update the image buffer based on an image buffer update rate, which may be the same rate at which camera 76 receives images, the same rate as which device 40 updates the frame buffer, or at a different rate.

As part of generating a clean preview, device 40 may, for example, compare the $t_0$ frame input with two or more prior frame inputs stored in the frame buffer to detect a moving object in the t0 frame (212). For purposes of this example, it can be assumed that the frame buffer is already storing frame inputs for $t_{-5}$, $t_{-10}$, etc. Device 40 may detect moving objects by comparing values of pixels of the $t_0$ frame to values of pixels at corresponding locations in the buffered frames. If the pixel values at a certain pixel location in a frame are consistent across all frames (i.e. the $t_0$ frame and the frames stored in the frame buffer), then that pixel value likely corresponds to a background pixel. If the pixel values at a certain location in a frame are not consistent across all the frames, then pixels at that location of at least some of the frames likely correspond to moving object pixels. For a particular pixel location, to determine for that pixel location which frames include background pixels and which frames include moving object pixels, device 40 may be configured to perform a voting technique, where the most frequently occurring pixel value is assumed to correspond to background. For the $t_0$ frame, device 40 may determine a label map. The label map identifies, for each pixel location in the preview image, a frame from which to obtain a pixel value for generating the preview image. The frame from which to obtain the pixel value may be either the current frame (i.e. the $t_0$ frame) or one of the buffered frames (i.e. the $t_{-5}$ frame, $t_{-10}$ frame, $t_{-20}$ frame, etc.).

Device 40 may recover a clean background (214). As part of recovering the clean background, device 40 may replace moving object pixels of the $t_0$ frame input with background pixels of one buffered frame input. To recover the clean background, device 40 may synthesize an image from one or more images stored in the frame buffer. For each pixel location of the synthesized image, device 40 may determine a pixel value for a background pixel at a corresponding location in one of the images stored in the frame buffer based on the label map. Thus, the synthesized image may include pixel values for background pixels of the image received at $t_0$, background pixels of the image received at $t_{-5}$, background pixels of the image received at $t_{-10}$, and potentially background pixels of other images stored in the frame buffer. Device 40 may output, via local display 56, for example, a clean preview image (216).

Device 40 may update the preview image being displayed at display 56 in a real time or near real time manner. For example, device 40 may receive a new frame input at $t_1$, in which case the image received at $t_0$ is now stored in the frame buffer. As explained above, the buffer may only be updated at 5 fps while camera system 76 generates images at 15 fps. Thus, at block 204, the frame input for $t_1$ may not be added to the frame buffer. The frame input for $t_1$ may, however, still be used for generating the clean preview image. Thus, at blocks 212 and 214, the frames used for detecting moving objects and generating label maps may include the frames for $t_1$ as well as buffered frames for $t_0$, $t_{-5}$, $t_{-10}$, etc.

Device 40 may output, via local display 56, for example, a clean frame as part of a clean preview (216). While displaying the clean preview image on local display 56 of device 40, device 40 may be configured to accept a user-initiated image capture request to capture an image (218). When device 40 does not receive a user-initiated image capture request, device 40 may update the clean preview image being displayed at display 56 in a real time or near real time manner. For example, device 40 may receive a new frame input at $t_1$, in which case the image received at $t_0$ is now stored in the frame buffer.

Device 40 may generate the clean preview image (e.g., blocks 202, 204, 206, 212, and 214) as part of an image preview mode with a clean preview feature enabled. When operating in the image preview mode, device 40 may be configured to detect a user-initiated image capture request, such as a touch command, voice command, button press, or some other such action. When device 40 does not detect a user-initiated image capture request (218, NO, not shown in FIG. 5), then device 40 continues to update the clean preview image. In response to receiving the user-initiated image capture request to capture an image (218, YES), device 40 outputs a clean, final image based on the images stored in the image buffer (220). The clean preview image being displayed on local display 56 at the time the user-initiated image capture request is received by device 40 may be an approximation of the final image. The final image may, however, not be identical to the clean preview image. Among other potential differences, the final image may be a higher resolution image than the clean preview image.

Additionally, to generate the final image, device 40 may perform one or more post-processing operations not performed for generating the clean preview image. Examples of such post-processing operations include brightness modification, noise reduction, white balance adjustments, blur reduction, zoom modification, red eye removal, image sharpening and/or softening, applying of special effects filters, adding of caption information, and so on. It should be understood that the techniques of this disclosure do not preclude these post-processing operations from being also applied to a preview image as part of the preview image generation process. Instead, it should merely be appreciated that the image processing operations utilized in creating the preview image may be different than the image processing operations utilized to create the final image, with the image processing operations utilized to create the final image typically being more computationally complex and intensive than the image processing operations utilized to create the preview image.

Figure 6:
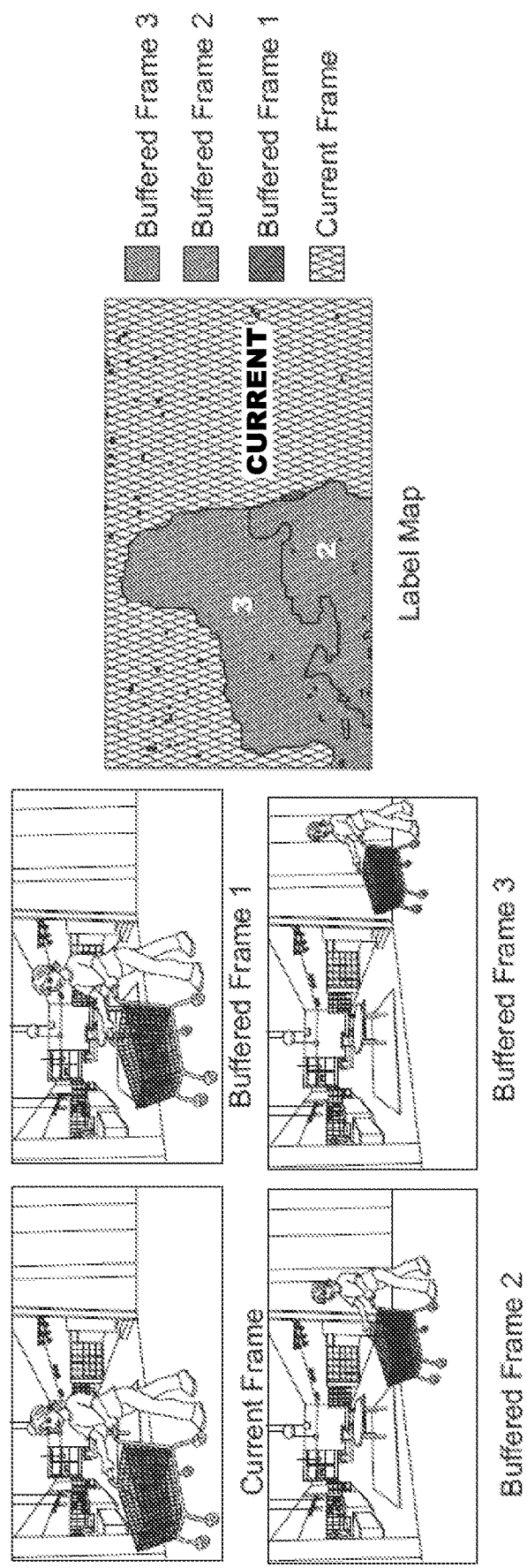
FIG. 6 shows an example of a label map in accordance with an example of the techniques of this disclosure.

As part of detecting moving objects in an input frame (e.g., block 108 of FIG. 4 and block 212 of FIG. 5), device 40 may determine a label map for a current input frame. The label map may, for each pixel of a preview image, identify either the current input frame or a frame from the frame buffer. FIG. 6, for example, shows a label map that corresponds to a preview image. Some pixel locations in the label map are associated with the current frame, some are associated with buffered frame 1, some are associated with buffer framed 2, and some are associated with buffered frame 3. Thus, to generate a preview image based off of the label map of FIG. 6, device 40 generates a synthesized image that includes pixel values from the current frame in the region of the label map associated with the current frame, pixel values from the first buffered frame in the region of the label map associated with buffered frame one, pixel values from the second buffered frame in the region of the label map associated with buffered frame two, and pixel values from the third buffered frame in the region of the label map associated with buffered frame three. Thus, device 40 may generate a preview image that is a synthesized image from the current frame, the first buffered frame, the second buffered frame, and the third buffered frame. By generating the preview image using pixels from the current frame and the buffered frames, device 40 may generate a preview that excludes unwanted objects from the preview image.

Figure 7:
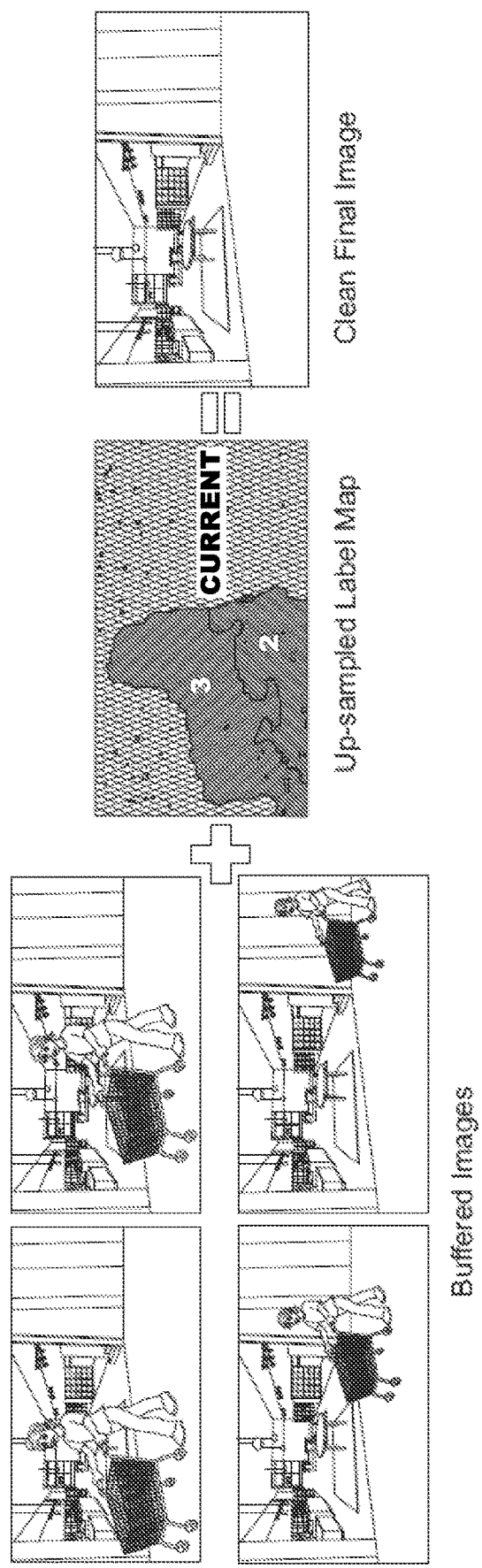
FIG. 7 shows an example of an up-sampled label map that may be used to generate a final image in accordance with an example of the techniques of this disclosure.

FIG. 7 shows an example of an up-sampled label map. Device 40 generates the up-sampled label map of FIG. 7 by up-sampling the label map of FIG. 6. As can be seen by comparing the label map of FIG. 6 to the up-sampled label map of FIG. 7, the two label maps are approximately the same. The up-sampled label map, however, is at a higher resolution. In the same manner that device 40 uses the label map of FIG. 6 to identify frames for generating a synthesized preview image, device 40 may use the up-sampled label map to generate a final image. Thus, device 40 may generate a final image that is a synthesized image from the current image, the first buffered image, the second buffered image, and the third buffered image. By generating the final image using pixels from the current image and the buffered images, device 40 may generate a final image that excludes unwanted objects from the final image. Generating the final image using an up-sampled version of the label map used to generate the preview image may improve the processing time associated with generating the final image.

Figure 8:
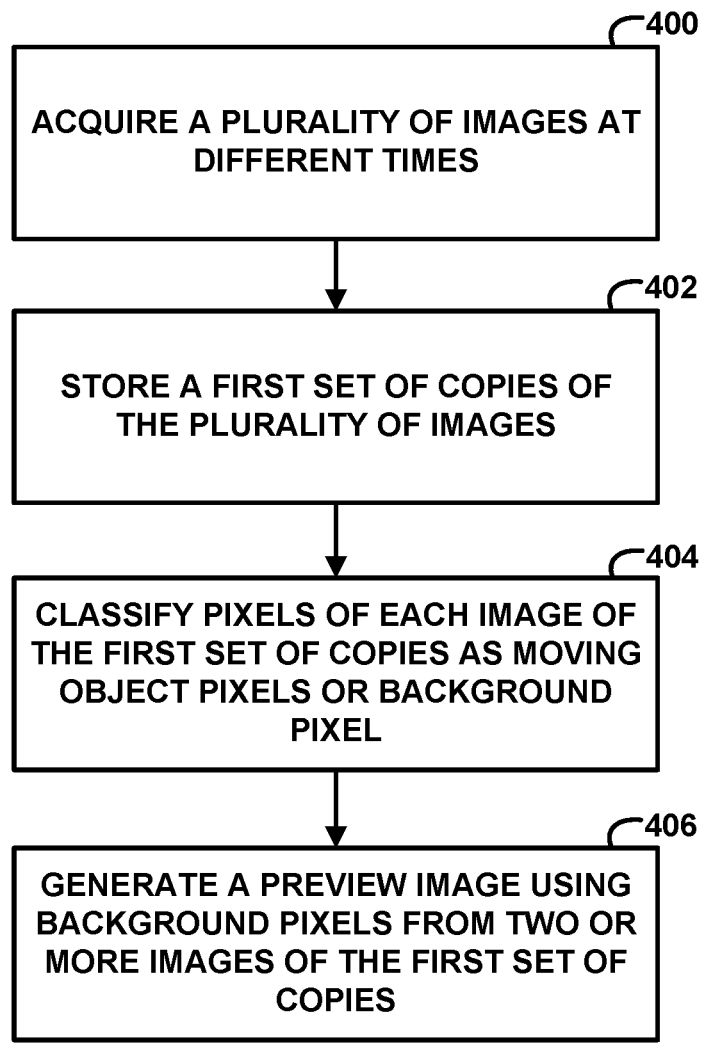
FIG. 8 is a flow diagram showing techniques for generating a preview image according to an example of the techniques of this disclosure.

FIG. 8 shows a flowchart illustrating techniques of this disclosure. The techniques of FIG. 8 will be described with reference to a generic camera device. The generic camera device may, for example, be device 20 described with respect to FIG. 1, device 40 described with respect to FIG. 3, or some other device configured to process image data. In the context of FIG. 8, the camera device may also refer to one or more camera components, such as a camera chip set, that work in conjunction with other components, such as an image sensor or display, but are in fact separate from those other components. The camera device acquires a plurality of images at different times (400). The camera device may, for example, receive such images from an image sensor. The camera device stores, in a buffer, a first set of copies of the plurality of images (402). The first set of copies may be stored at a first pixel, i.e., spatial, resolution. The camera device may classify pixels of each image of the first set of copies as moving object pixels or background pixels (404). The camera device may generate a clean preview image using background pixels from two or more images of the first set of copies (406). The clean preview image may exclude one or more of the moving object pixels found in one or more of the images of the plurality of images.

The clean preview image may, for example, be an image synthesized from two or more images of the first set of copies, with at least one object present in one or more images of the first set of copies not being present in the clean preview image. To generate the clean preview image, the camera device may generate a synthesized image from pixels classified as background pixels from two or more images of the first set of copies.

The camera device may acquire the plurality of images while the camera device is operating in an image preview mode and prior to a user-initiated image acquisition request. The camera device may display the clean preview image on a display of the camera device. While displaying the clean preview image, the camera device may receive a user-initiated image acquisition request, and in response to the user-initiated image acquisition request, generate a final image. The final image may have a second resolution higher than the first resolution.

The preview image may be an approximation of the final image. Therefore, one or more of the unwanted object pixels excluded from the preview image may also be excluded from the final image. The one or more unwanted object pixels may collectively form an unwanted object that is excluded from both the preview image and the final image despite being present in the received plurality of images.

The camera device may be configured to generate a label map. The label map may be a data structure that associates each pixel of a clean preview image with an image from the first set of copies. To generate the clean preview, the camera device may, for a pixel location of the clean preview image, determine from the label map the image identified for the pixel location and determine, in the identified image, a pixel value of a same location as the pixel location of the clean preview image. The camera device may determine a pixel value for the pixel location of the clean preview image based on the pixel value (e.g. RGB values, or $YC_BC_R$ values) of the same location of the identified image.

The camera device may store, in the buffer, a second set of copies of the plurality of images. The second set of copies of the plurality of images may be at a second resolution that is higher than the first resolution used for the first set of copies. In response to a user-initiated image acquisition request, the camera device may generate a final image using background pixels from two or more images of the second set of copies. To generate the final image, the camera device may up-sample the label map, and for a pixel location of the final image, determine from the up-sampled label map the image identified for the pixel location of the final image. The camera device may determine, in the identified image, a pixel value of a same location as the pixel location of the final image. The camera device may determine a pixel value for the pixel location of the final image based on the pixel value of the same location of the identified image.

It should also be understood that, depending on the example, certain acts or events of any of the methods described herein can be performed in a different sequence, or may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

Moreover, in one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method comprising:
  receiving, from an image sensor, a plurality of images at different times, wherein receiving the plurality of images occurs in an image preview mode and prior to a user-initiated image capture request;
  storing, in a buffer, a first set of copies of the plurality of images, wherein the first set of copies is at a first resolution;
  classifying pixels of each image of the first set of copies as moving object pixels or background pixels; and generating a preview image using background pixels from two or more images of the first set of copies, wherein the preview image excludes one or more of the moving object pixels and wherein generating the preview image comprises:
    for a first pixel location of the preview image, determining a first image of the two or more images, wherein a first pixel in the first image at a corresponding location to the first pixel location of the preview image is classified as a first background pixel;
    determining a pixel value for the first background pixel in the first image;
    for a second pixel location of the preview image, determining a second image of the two or more images, wherein a second pixel in the second image at a corresponding location to the second pixel location of the preview image is classified as a second background pixel;
    determining a pixel value for the second background pixel;
    determining a pixel value for the first pixel location of the preview image based on the pixel value of the first background pixel; and
    determining a pixel value for the second pixel location of the preview image based on the pixel value of the second background pixel.

2. The method of claim 1, wherein the preview image comprises an image synthesized from portions of two or more images of the first set of copies, wherein at least one object present in one or more images of the first set of copies is not present in the preview image.

3. The method of claim 1, further comprising:
displaying the preview image on a display;
while displaying the preview image, receiving a user-initiated image capture request;
in response to the user-initiated image capture request, generating a final image, wherein the final image has a second resolution higher than the first resolution.

4. The method of claim 3, wherein the preview image comprises an approximation of the final image, wherein the final image excludes one or more of the moving object pixels.

5. The method of claim 1, further comprising:
generating a label map, wherein the label map identifies, for each pixel of the preview image, an image from the first set of copies.

6. The method of claim 5, further comprising:
storing, in the buffer, a second set of copies of the plurality of images, wherein the second set of copies of the plurality of images are at a second resolution that is higher than the first resolution;
in response to a user-initiated image capture request, generating a final image using background pixels from two or more images of the second set of copies.

7. The method of claim 6, wherein generating the final image comprises:
up-sampling the label map;
for a pixel location of the final image, determining from the up-sampled label map an image identified for the pixel location of the final image;
determining, in the identified image, a pixel value of a same location as the pixel location of the final image;
determining a pixel value for the pixel location of the final image based on the pixel value of the same location of the identified image.

8. The method of claim 7, wherein generating the final image comprises performing one or more post-processing operations not performed for generating the preview image.

9. The method of claim 1, further comprising:
receiving, from the image sensor, the plurality of images at a first rate; and
updating the first set of copies of the plurality of images stored in the buffer at a second rate, wherein the second rate is lower than the first rate.

10. An electronic device comprising:
a memory;
one or more processors configured to:
    receive, from an image sensor, a plurality of images at different times, wherein the one or more processors receive the plurality of images while operating in an image preview mode and prior to a user-initiated image capture request;
    store, in the memory, a first set of copies of the plurality of images, wherein the first set of copies is at a first resolution;
    classify pixels of each image of the first set of copies as moving object pixels or background pixels; and
    generate, for output on the display, a preview image using background pixels from two or more images of the first set of copies, wherein the preview image excludes one or more of the moving object pixels and wherein the one or more processors are configured to generate the preview image by:
        for a first pixel location of the preview image, determining a first image of the two or more images, wherein a first pixel in the first image at a corresponding location to the first pixel location of the preview image is classified as a first background pixel;
        determining a pixel value for the first background pixel in the first image;
        for a second pixel location of the preview image, determining a second image of the two or more images, wherein a second pixel in the second image at a corresponding location to the second pixel location of the preview image is classified as a second background pixel;
        determining a pixel value for the second background pixel;
        determining a pixel value for the first pixel location of the preview image based on the pixel value of the first background pixel; and
        determining a pixel value for the second pixel location of the preview image based on the pixel value of the second background pixel.

11. The electronic device of claim 10, wherein the preview image comprises an image synthesized from portions of two or more images of the first set of copies, wherein at least one object present in one or more images of the first set of copies is not present in the preview image.

12. The electronic device of claim 10, further comprising:
a display to display the preview image;
wherein the one or more processors are further configured to
    receive a user-initiated image capture request while the display is displaying the preview image; and
    in response to the user-initiated image capture request, generate a final image, wherein the final image has a second resolution higher than the first resolution.

13. The electronic device of claim 12, wherein the preview image comprises an approximation of the final image, and wherein the final image excludes one or more of the moving object pixels.

14. The electronic device of claim 10, wherein the one or more processors are further configured to generates a label map, wherein the label map identifies, for each pixel of the preview image, an image from the first set of copies.

15. The electronic device of claim 14, wherein the one or more processors are further configured to
store, in the buffer, a second set of copies of the plurality of images, wherein the second set of copies of the plurality of images are at a second resolution that is higher than the first resolution; and
in response to a user-initiated image capture request, generate a final image using background pixels from two or more images of the second set of copies.

16. The electronic device of claim 15, wherein to generate the final image the one or more processors are further configured to:
up-sample the label map;
for a pixel location of the final image, determine from the up-sampled label map an image identified for the pixel location of the final image;
determine, in the identified image, a pixel value of a same location as the pixel location of the final image; and
determine a pixel value for the pixel location of the final image based on the pixel value of the same location of the identified image.

17. The electronic device of claim 16, wherein to generate the final image, the one or more processors are further configured to perform one or more post-processing operations not performed for generating the preview image.

18. The electronic device of claim 10, wherein the one or more processors are further configured to
receive, from the image sensor, the plurality of images at a first rate; and
update, the first set of copies of the plurality of images stored in the buffer at a second rate, wherein the second rate is lower than the first rate.

19. The electronic device of claim 10, wherein the electronic device comprises one or more of:
a microprocessor;
an integrated circuit (IC); or
a wireless communication device comprising the image sensor and a display.

20. An apparatus comprising:
means for receiving, from an image sensor, a plurality of images at different times, wherein receiving the plurality of images occurs in an image preview mode and prior to a user-initiated image capture request;
means for storing a first set of copies of the plurality of images, wherein the first set of copies is at a first resolution;
means for classifying pixels of each image of the first set of copies as moving object pixels or background pixels; and
means for generating a preview image using background pixels from two or more images of the first set of copies, wherein the preview image excludes one or more of the moving object pixels and wherein the means for generating a preview image comprises:
for a first pixel location of the preview image, means for determining a first image of the two or more images, wherein a first pixel in the first image at a corresponding location to the first pixel location of the preview image is classified as a first background pixel;
means for determining a pixel value for the first background pixel in the first image;
for a second pixel location of the preview image, means for determining a second image of the two or more images, wherein a second pixel in the second image at a corresponding location to the second pixel location of the preview image is classified as a second background pixel;
means for determining a pixel value for the second background pixel;
means for determining a pixel value for the first pixel location of the preview image based on the pixel value of the first background pixel; and
means for determining a pixel value for the second pixel location of the preview image based on the pixel value of the same location of the second background pixel.

21. The apparatus of claim 20, further comprising:
means for displaying the preview image;
means for receiving a user-initiated image capture request while the means for displaying displays the preview image; and
means for generating a final image in response to the user-initiated image capture request, wherein the final image has a second resolution higher than the first resolution.

22. The apparatus of claim 21, further comprising:
means for storing a second set of copies of the plurality of images, wherein the second set of copies of the plurality of images are at a second resolution that is higher than the first resolution; and
means for, in response to a user-initiated image capture request, generating a final image using background pixels from two or more images of the second set of copies.

23. The apparatus of claim 22, wherein the means for generating the final image comprises:
means for up-sampling the label map;
for a pixel location of the final image, means for determining from the up-sampled label map an image identified for the pixel location of the final image;
means for determining, in the identified image, a pixel value of a same location as the pixel location of the final image; and
means for determining a pixel value for the pixel location of the final image based on the pixel value of the same location of the identified image.

24. A non-transitory computer-readable storage medium storing instructions that when executed by one or more processors cause the one or more processors to:
receive, from an image sensor, a plurality of images at different times, wherein receiving the plurality of images occurs in an image preview mode and prior to a user-initiated image capture request;
store, in a buffer, a first set of copies of the plurality of images, wherein the first set of copies is at a first resolution;
classify pixels of each image of the first set of copies as moving object pixels or background pixels; and
generate a preview image using background pixels from two or more images of the first set of copies, wherein the preview image excludes one or more of the moving object pixels and wherein the instructions when executed cause the one or more processors to generate the preview image by:

for a first pixel location of the preview image, wherein a first pixel in the first image at a corresponding location to the first pixel location of the preview image is classified as a first background pixel;

determining a pixel value for the first background pixel in the first image;

for a second pixel location of the preview image, determining a second image of the two or more images, wherein a second pixel in the second image at a corresponding location to the second pixel location of the preview image is classified as a second background pixel;

determining a pixel value for the second background pixel;

determining a pixel value for the first pixel location of the preview image based on the pixel value of the first background pixel; and determining a pixel value for the second pixel location of the preview image based on the pixel value of the second background pixel.

25. The non-transitory computer-readable storage medium of claim 24, storing further instructions that when executed cause the one or more processors to:

display the preview image on a display;

while displaying the preview image, receive a user-initiated image capture request; and in response to the user-initiated image capture request, generating a final image, wherein the final image has a second resolution higher than the first resolution.

26. The non-transitory computer-readable storage medium of claim 24, storing further instructions that when executed cause the one or more processors to:

generate a label map, wherein the label map identifies, for each pixel of the preview image, an image from the first set of copies.

27. The non-transitory computer-readable storage medium of claim 24, storing further instructions that to generate the preview cause the one or more processors to:

store, in the buffer, a second set of copies of the plurality of images, wherein the second set of copies of the plurality of images are at a second resolution that is higher than the first resolution; and in response to a user-initiated image capture request, generate a final image using background pixels from two or more images of the second set of copies.

* * * * *

UNITED STATES PATENT AND TRADEMARK OFFICE
CERTIFICATE OF CORRECTION

PATENT NO. : 10,616,502 B2  
APPLICATION NO. : 15/757278  
DATED : April 7, 2020  
INVENTOR(S) : Jingting Ding, Fan Ling and Xuan Zhou Page 1 of 1

It is certified that error appears in the above-identified patent and that said Letters Patent is hereby corrected as shown below:

On the Title Page

Item (72) Inventors:
DELETE "Jingting Ding, Hangzhou (CN); Fan Ling, Shanghai (CN); Xuan Zhou, Shanghai (CN)"
INSERT --Jingting Ding, Hangzhou (CN); Fan Ling, Shanghai (CN); Xuan Zou, Shanghai (CN)--

Signed and Sealed this
Twenty-ninth Day of September, 2020

Andrei Iancu
*Director of the United States Patent and Trademark Office*